US008646002B2

(12) United States Patent
Lee et al.

(10) Patent No.: US 8,646,002 B2
(45) Date of Patent: Feb. 4, 2014

(54) SYSTEM FOR REALISTICALLY REPRODUCING MULTIMEDIA CONTENT AND METHOD THEREOF

(75) Inventors: Hoon Ki Lee, Daejeon (KR); Eui Hyun Paik, Daejeon (KR); Kwang Roh Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1087 days.

(21) Appl. No.: 12/209,620

(22) Filed: Sep. 12, 2008

(65) Prior Publication Data

US 2009/0157753 A1     Jun. 18, 2009

(30) Foreign Application Priority Data

Dec. 17, 2007    (KR) ........................ 10-2007-0132856

(51) Int. Cl.
*H04N 5/445*      (2011.01)
(52) U.S. Cl.
USPC .................. 725/40; 725/37; 725/54; 725/105
(58) Field of Classification Search
USPC ...................................................... 725/37–61
See application file for complete search history.

(56) References Cited

U.S. PATENT DOCUMENTS

| | | | |
|---|---|---|---|
| 2002/0120933 A1* | 8/2002 | Knudson et al. | 725/42 |
| 2003/0115606 A1* | 6/2003 | Menez | 725/60 |
| 2005/0022237 A1* | 1/2005 | Nomura | 725/39 |
| 2006/0074848 A1* | 4/2006 | Lee et al. | 707/1 |
| 2007/0126927 A1 | 6/2007 | Yun et al. | |

FOREIGN PATENT DOCUMENTS

| | | |
|---|---|---|
| KR | 10-2004-0015279 | 2/2004 |
| KR | 10-2005-0045700 | 5/2005 |
| KR | 10-2006-0025100 | 3/2006 |

* cited by examiner

*Primary Examiner* — Nicholas Corbo
(74) *Attorney, Agent, or Firm* — Staas & Halsey LLP

(57) ABSTRACT

A system for realistically reproducing multimedia content includes a realistic multimedia content producer for providing the multimedia content; a device metadata server for providing device metadata for realistically reproducing the multimedia content; and a realistic multimedia reproducing apparatus for downloading the device metadata for the multimedia content from the device metadata server, and applying device metadata selected by a user to thereby reproduce the multimedia content. Further, a method for realistically reproducing multimedia content includes downloading multimedia content to be reproduced realistically; checking if the multimedia content includes device metadata for realistic reproduction; downloading a plurality of device metadata for realistic reproduction of the multimedia content if the multimedia content does not include the device metadata; and reproducing realistically the multimedia content by controlling a reproducing device to which metadata selected by a user from the plurality of device metadata are applied.

12 Claims, 7 Drawing Sheets

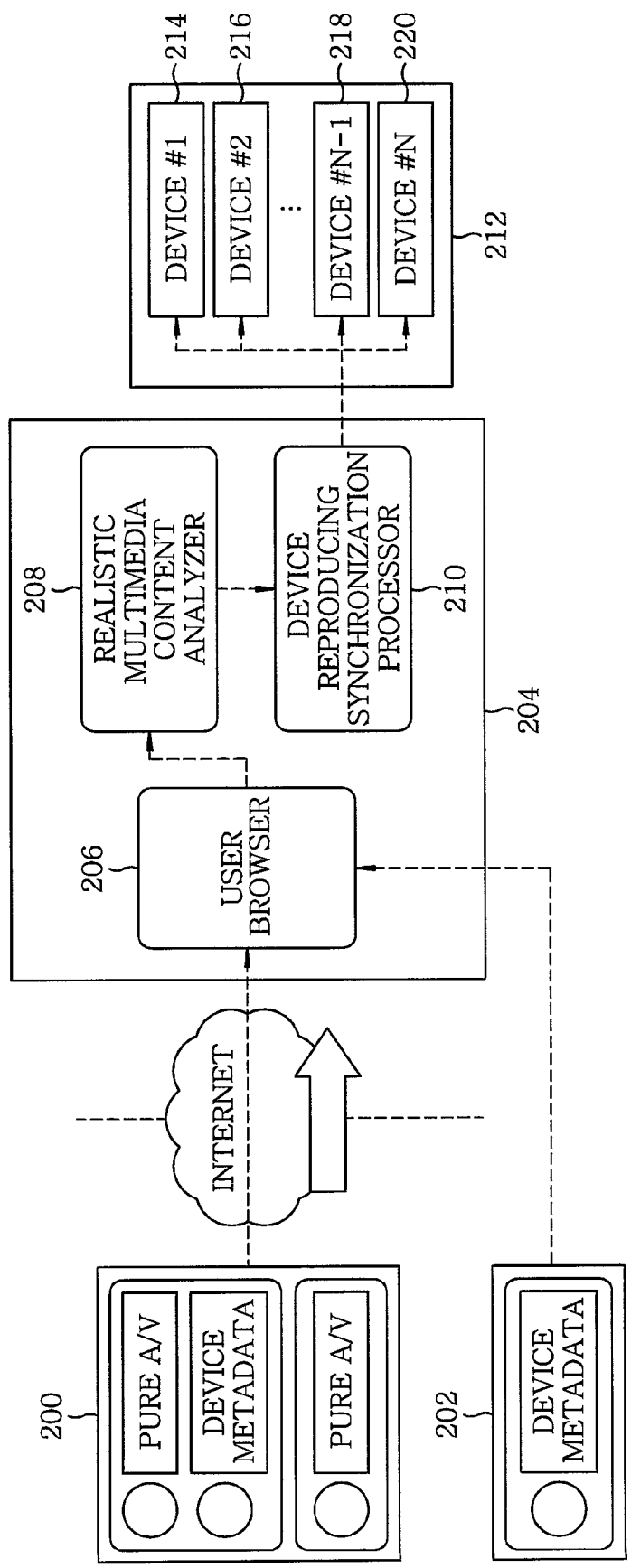

FIG. 3A

⇨ requestOfMetadata

| tID | mName | mCodec | mTime | mType |
|-----|-------|--------|-------|-------|
| (2) | (256) | (4)    | (4)   | (1)   |

FIG. 3B

⇨ reponseOfMetadata

| tID | mName | tLength | mCnt | mLength | METADATA PLALOAD |
|-----|-------|---------|------|---------|------------------|
| (2) | (256) | (2)     | (1)  | (4)     |                  |

SYSTEM FOR REALISTICALLY REPRODUCING MULTIMEDIA CONTENT AND METHOD THEREOF

CROSS-REFERENCE(S) TO RELATED APPLICATIONS

The present invention claims priority of Korean Patent Application No. 10-2007-0132856, filed on Dec. 17, 2007, which is incorporated herein by reference.

FIELD OF THE INVENTION

The present invention relates to a system for realistically reproducing multimedia contents; and, more particularly, to a system and method for realistically reproducing multimedia contents which are capable of reproducing various types of realistic effects depending on a user's selection in a manner that downloads metadata containing control information of a reproduction device for reproducing realistic multimedia content from the Internet or a specific provider so that the metadata is provided separately from conventional multimedia content.

This work was supported by the IT R&D program of MIC/IITA. [2007-S-010-01, Development of Ubiquitous Home Media Service System based on Single Media Multi Device (SMMD)]

BACKGROUND OF THE INVENTION

Conventionally, most realistic multimedia contents are transmitted together with metadata for realistic representation in a stream track for multimedia content in a transmitting step. A conventional realistic multimedia reproducer analyzes a control method and a control time of a device for realistic reproduction based on the metadata transmitted with multimedia data, and reproduces the realistic multimedia contents.

However, in a conventional scheme in which the metadata for reproducing realistic multimedia content is transmitted with the multimedia content as described above, a multimedia processing system for receiving and reproducing the multimedia content is forced to implement a realistic effect only in the same method as used by a realistic multimedia content producer at a transmitting side, thus limiting a realistic effect reproduction method.

That is, even though the multimedia processing system at the receiving side is capable of reproducing various types of realistic effects depending on types of devices provided for the system, there is a problem that the system is forced to reproduce the realistic multimedia content only in the same scheme as used by the producer at the transmitting side, which makes it impossible for a user to efficiently utilize the devices provided for realistic effects.

Further, every time that a new type of device is added to the multimedia processing system, another realistic multimedia content must be newly produced by a realistic media content producer, which makes a task troublesome and wastes resources. Also, it is preferable that different environments are provided for already existing devices depending on realistic effects and the realistic effects are represented depending on a user's reproduction environment, however, a conventional method where device metadata for realistic representation exist in a single form limits representing manners greatly.

FIG. 1 describes a block diagram of a system for reproducing conventional realistic multimedia content, which contains device metadata. That is, under this structure of the realistic multimedia content, in a step of producing the realistic multimedia content, a media stream has a pure audio and video track, and contains metadata controlling each device for realistic representation according to a time stamp.

Referring to FIG. 1, a realistic multimedia producing unit 100 includes two or more tracks. The realistic multimedia producing unit 100 produces multimedia content containing pure A/V (audio/video) data corresponding to a pure multimedia stream and device metadata for controlling device for realistic effect representation. The multimedia content, thus produced, is provided for a realistic multimedia content processing system via the Internet and is realistically represented through a reproduction process.

The realistic multimedia content processing system includes a realistic multimedia content analyzing unit 102 and a realistic multimedia content reproducing unit 110. The realistic multimedia content analyzing unit 102 receives a streaming service by selecting realistic multimedia content through a user browser 104, and separates the pure A/V data and the device metadata in the realistic multimedia content through a realistic multimedia content analyzer 106, so that the pure A/V data is reproduced by an audio and video output device corresponding thereto. A device reproducing synchronization processor 108 synchronizes the device metadata and the multimedia content.

In the realistic multimedia content reproducing unit 110, devices 112, 114, 116, and 118 reproduce the multimedia content synchronized with the device metadata by the device reproducing synchronization processor 108 to represent a realistic effect.

As described above, in the conventional realistic multimedia content processing system, a realistic multimedia content contains metadata for controlling device for realistic representation, as well as pure A/V stream. In the above-described structure of the conventional multimedia content processing system, realistic representation is reproduced using only device reproduction information defined by a realistic multimedia content producer. Accordingly, realistic representation of the multimedia content is limited, and it is impossible to satisfy demands on various realistic representations from each user, as described above.

SUMMARY OF THE INVENTION

It is, therefore, an object of the present invention to provide a system and method for reproducing realistic multimedia content, in which, in reproducing new realistic media contents as well as existing multimedia contents, device metadata for various types of realistic effects for the multimedia content is allowed to be downloaded in an Internet environment, unlike a conventional manner where device control information is included in the multimedia content, so that the various types of the realistic effects are reproduced depending on a user's selection.

In accordance with one aspect of the present invention, there is provided a system for realistically reproducing multimedia content, including a realistic multimedia content producer for providing the multimedia content; a device metadata server for providing one or more device metadata for realistically reproducing the multimedia content; and a realistic multimedia reproducing apparatus for downloading said one or more device metadata for the multimedia content from the device metadata server, and applying device metadata selected by a user to thereby reproduce the multimedia content in a realistic manner corresponding to the selected device metadata.

It is preferable that the multimedia content provided by the realistic multimedia producer is either multimedia content including pure A/V data or a realistic multimedia content including device metadata for realistic reproduction.

The realistic multimedia reproducing apparatus may include a multimedia content analyzing unit for synchronizing the multimedia content and the device metadata selected for realistic reproduction; and a multimedia content reproducing unit for controlling a device in the realistic multimedia reproducing apparatus based on the device metadata to thereby realistically reproduce the multimedia content.

It is preferable that the multimedia content analyzing unit includes: a multimedia content analyzer for analyzing whether the multimedia content is valid reproducible content; a device metadata processor for verifying validity of the downloaded device metadata; and a device synchronization processor for synchronizing the multimedia content and the device metadata in order to control operation of the device corresponding to each of the device metadata.

Further, it is preferable that the multimedia content reproducing unit includes: a device multi-processor for controlling a corresponding device based on the device metadata; and a device manager for verifying an operational state of the device.

The realistic multimedia content reproducing apparatus may download the multimedia content and the device metadata via a wired or a wireless communication network.

In accordance with another aspect of the present invention, there is provided a method for realistically reproducing multimedia content, including: downloading multimedia content to be reproduced realistically; checking if the multimedia content includes device metadata for realistic reproduction; downloading a plurality of device metadata for realistic reproduction of the multimedia content if the multimedia content does not include the device metadata; and reproducing realistically the multimedia content by controlling a reproducing device to which metadata selected by a user from the plurality of device metadata are applied.

The method may further include reproducing realistically the multimedia content by controlling the reproducing device based on the device metadata, if the multimedia content includes device metadata.

It is preferable that the multimedia content and the device metadata are downloaded via a wired or a wireless communication network.

The present invention enables device metadata for realistic effects in a multimedia content to be selectively downloaded via the Internet, so that the multimedia content plays a main role in reproducing original audio/video data and control of several realistic devices corresponding to each frame is performed by the separate metadata, thereby achieving various types of realistic effects for each user in reproducing the multimedia content realistically.

BRIEF DESCRIPTION OF THE DRAWINGS

The above and other objects and features of the present invention will become apparent from the following description of embodiments given in conjunction with the accompanying drawings, in which:

FIG. 2 is a detailed block diagram illustrating a realistic multimedia content reproducing system in accordance with an embodiment of the present invention;

FIGS. 3A to 3B illustrate structures of headers of downloadable device metadata packets in accordance with an embodiment of the present invention;

DETAILED DESCRIPTION OF THE EMBODIMENTS

Hereinafter, embodiments of the present invention will be described in detail with reference to the accompanying drawings so that they can be readily implemented by those skilled in the art.

FIG. 2 is a block diagram illustrating a configuration of a realistic multimedia content reproducing system which is capable of processing downloadable device metadata for controlling realistic multimedia content in accordance with an embodiment of the present invention.

Figure 1:
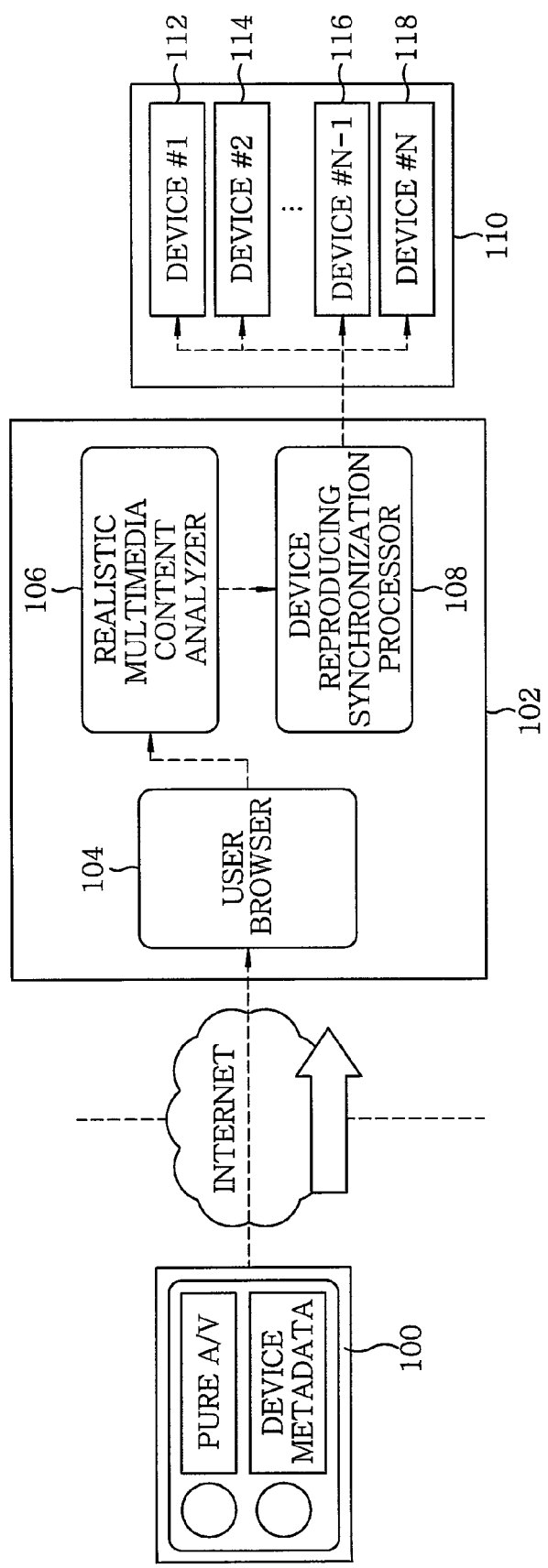
FIG. 1 is a schematic block diagram illustrating a conventional realistic multimedia content reproducing system.

Referring to FIG. 2, a realistic multimedia content producing unit 200 of the present invention may provide two types of multimedia contents. The realistic multimedia producing unit 200 may produce a realistic multimedia content containing device metadata as well as pure A/V data as shown in FIG. 1; and a multimedia content containing only existing pure A/V data.

Most multimedia contents consist of only pure A/V data. In order to implement various types of realistic representations even in such a multimedia content consisting of the pure A/V data as described above, the present invention reproduces realistic effects in a manner that downloads realistic device metadata 202 corresponding to media content, instead of producing media content through a new realistic multimedia content producing process.

In operation, in a realistic multimedia content analyzing unit 204 of the realistic multimedia content reproducing system, a user browser 206 selects a multimedia content, and a realistic multimedia content analyzer 208 analyzes to see whether the selected multimedia content contains device metadata for realistic reproduction. For the result of the analyzing, if the selected multimedia content does not contain the device metadata for realistic reproduction, device metadata 202 corresponding to the content is downloaded from an external device metadata provider. A device reproducing synchronization processor 210 synchronizes the device metadata and the multimedia content.

A realistic multimedia content reproducer 212 then controls devices 214, 216, 218, and 220 based on pure A/V data and device metadata 202 downloaded from the external device metadata provider to reproduce the multimedia content representing realistic effects. Thus, it is possible to reproduce various realistic effects using the downloaded device metadata 202.

FIGS. 3A to 3B illustrate structures of headers of device metadata downloading packets in accordance with an embodiment of the present invention, Structures of transmitting/receiving messages for device metadata provided from an external server (i.e., a service provider) in order to realistically reproduce a multimedia content containing no device metadata will now be described in detail.

First, FIG. 3A illustrates a structure of a metadata request message (requestOfMetadata) for requesting the external device metadata 202. Referring to FIG. 3A, the metadata request message consists of five parameters. tID is a message identifier and is used as a key value for transaction management. mName is a name of multimedia content and is used as a value for retrieving device metadata of a currently reproduced content. When a multimedia content is produced by a number of CODECs, there are a number of types multimedia content for the same content, and so mCodec is used as an identification value of such a compression CODEC. mTime represents a total reproduction time of the produced multimedia content. Since different device metadata can be produced depending on the reproduction time, mTime is used as a value for identifying the total reproduction time of the media upon retrieving current device metadata. Finally, mType is a value for identifying whether a multimedia content requested for retrieval is pure A/V data or a realistic multimedia content. Because the realistic multimedia content contains device metadata, mType is used as a key value for excluding the same device metadata.

FIG. 3B illustrates a structure of a metadata response message (responseOfMetadata) responding to the metadata request (requestOfMetadata) of FIG. 3A. Referring to FIG. 3B, the metadata response message consists of six fields. tID is used as a key value for identifying transaction, as described above. Further, mName indicates a name of multimedia content and is used as a key value for identifying a message with media tID and identifying multimedia content. tLength indicates a total message length and is used a value for confirming whether a message is received securely. mCnt indicates the number of device metadata retrieved for the requested multimedia content. That is, there is a plurality of device metadata for the same content, and mCnt indicates the number of the device metadata currently contained in a message to be transmitted. mLength indicates a size of a metadata payload that is subsequent to mLength. Since the device metadata have different sizes from each other, each size of each of the device metadata is contained. The mLength field and the metadata payload are appended repeatedly as many as mCnt.

As described above, in accordance with an embodiment of the present invention, the device metadata for various types of realistic reproductions with respect to the same multimedia content are downloaded and used as a message for cooperation with a metadata providing server for realistic multimedia reproduction.

Figure 4:
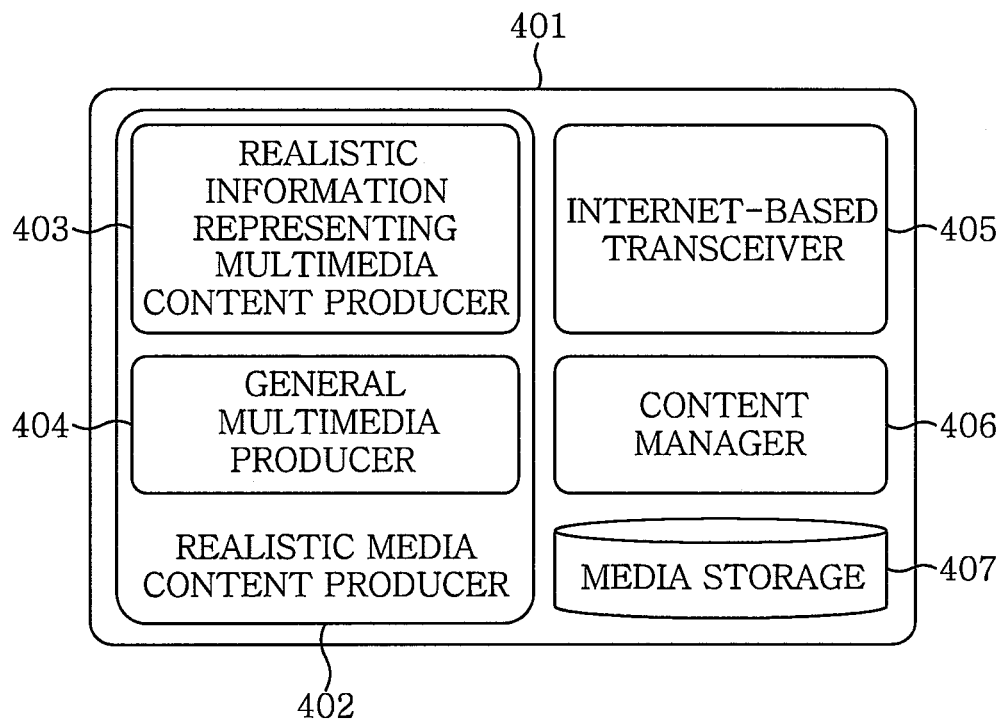
FIG. 4 is a detailed block diagram illustrating a realistic multimedia content producing unit in accordance with an embodiment of the present invention.

FIG. 4 is a detailed block diagram of a realistic multimedia content producing unit for producing a realistic multimedia content or a pure multimedia content in accordance with an embodiment of the present invention.

Referring to FIG. 4, a realistic media content producing unit 401 produces two types of multimedia contents. A realistic media content producer 402 includes a realistic information representing multimedia content producer 403 and a general multimedia content producer 404 for producing a general pure multimedia (pure A/V) content, wherein the realistic information has device metadata for realistic multimedia reproduction.

The realistic information representing multimedia content producer 403 forms a track for A/V data and another track including metadata for controlling a device for realistic reproduction in a multimedia stream. A content manager 406 provides a list of multimedia contents provided by the realistic media content producer 402. A user selects a specific content from the list of the multimedia contents provided by the content manager 406 and receives a service. A media storage 407 is a physical storage device in which the list managed by the content manager 406 is stored. An Internet-based transceiver 405 is a processor for transmitting the multimedia content list of the content manager 406 or multimedia content selected by a user in cooperation with a realistic multimedia content processing system.

Figure 5:
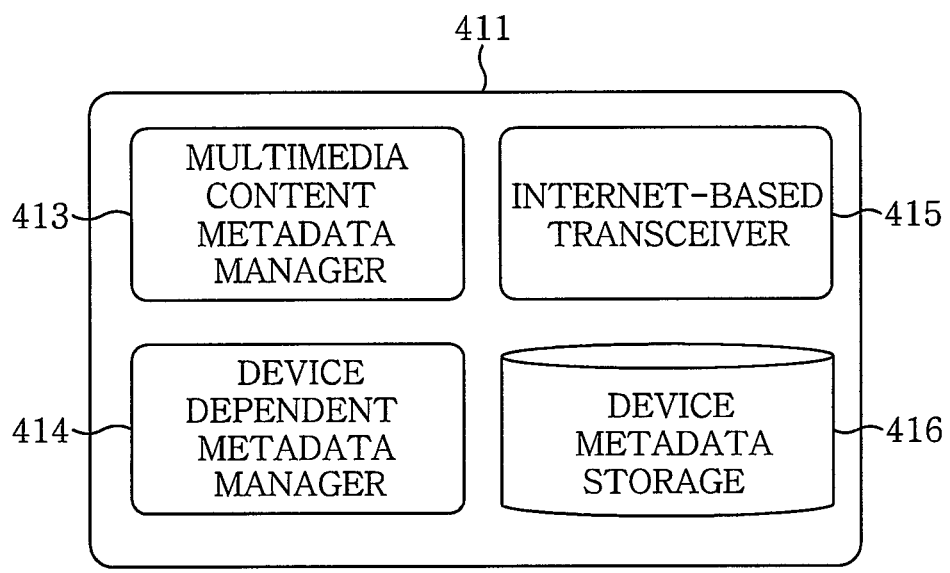
FIG. 5 is a detailed block diagram illustrating a device metadata server in accordance with an embodiment of the present invention.

FIG. 5 is a detailed block diagram illustrating a device metadata server 411 for producing device metadata for realistically reproducing multimedia content in accordance with an embodiment of the present invention. The device metadata server 411 produces and provides device metadata for realistic reproduction of each multimedia content.

Referring to FIG. 5, the device metadata server 411 includes a multimedia content dependent metadata manager 413 and a device dependent metadata manager 414. Device metadata stored in a physical device metadata storage 416 are managed as a plurality of device metadata for each multimedia content by the multimedia content dependent metadata manager 413, and managed by the device dependent metadata manager 414 classifying in accordance with types of devices contained in metadata. The device metadata for realistically reproducing multimedia content contain information on a device to be reproduced and a control condition.

An Internet-based transceiver 415 of the device metadata server 411 receives a message for requesting metadata for a device realistically reproducing multimedia content as shown in FIG. 3A, and transmits retrieved metadata classified according to multimedia content or a device as a response message, as shown in FIG. 3B, to a multimedia content reproducing system. As described above, the device metadata server 411 produces device metadata of a downloadable type for realistic reproduction, and stores and manages the metadata. The device metadata server 411 is an information provider similar to a general service provider, which provides device metadata for realistically reproducing a multimedia content.

Figure 6:
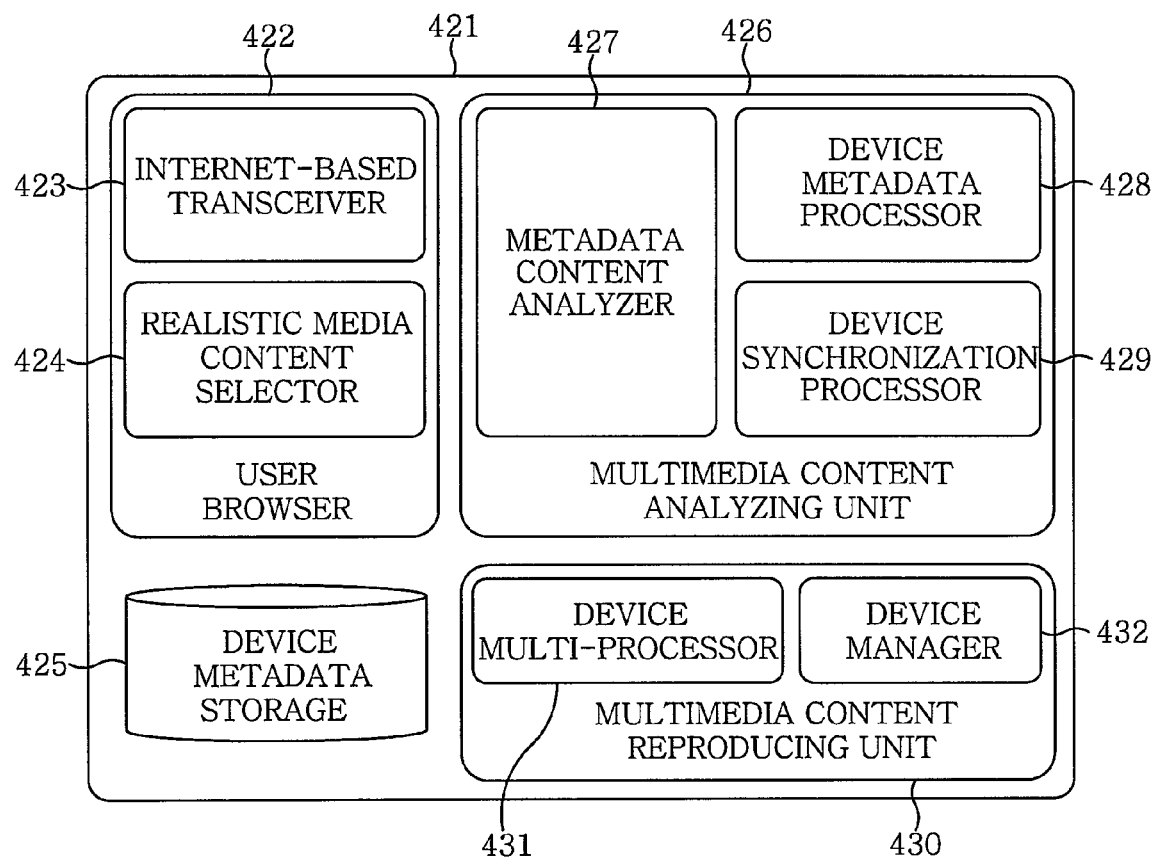
FIG. 6 is a detailed block diagram illustrating a realistic multimedia content reproducing apparatus in accordance with an embodiment of the present invention.

FIG. 6 is a detailed block diagram illustrating a realistic multimedia reproducing apparatus in accordance with an embodiment of the present invention. The realistic multimedia reproducing apparatus realistically reproduces a multimedia content in cooperation with the realistic multimedia content producing unit 401 and the device metadata server 411 shown in FIGS. 4 and 5.

Referring to FIG. 6, a realistic multimedia content reproducing apparatus 421 is provided with a multimedia content list and a content stream from the realistic multimedia content producing unit 401 and the device metadata server 411 via an Internet-based transceiver 423 in a user browser 422. The realistic multimedia content reproducing apparatus 421 also receives device metadata for reproducing the multimedia content realistically.

A realistic media content selector 424 selects a multimedia content to be reproduced, from the downloaded multimedia content list and the device metadata list. Under a situation that each multimedia content and the metadata, such as a multimedia content, device metadata and the like, are selected, a multimedia content analyzing unit 426 synchronizes the multimedia content and the device metadata. A multimedia content analyzer 427 analyzes to see whether the multimedia content is a valid reproducible content, and a device metadata processor 428 verifies validity of the downloaded metadata. Such content analyzed by the multimedia analyzer 427 and the device metadata processor 428 is controlled by a device synchronization processor 429 for device reproduction corresponding to each metadata.

A multimedia content reproducing unit 430 includes a device multi-processor 431 for actually controlling a device based on the device metadata, and a device manager 432 for verifying a corresponding state of the device.

Figure 7A:
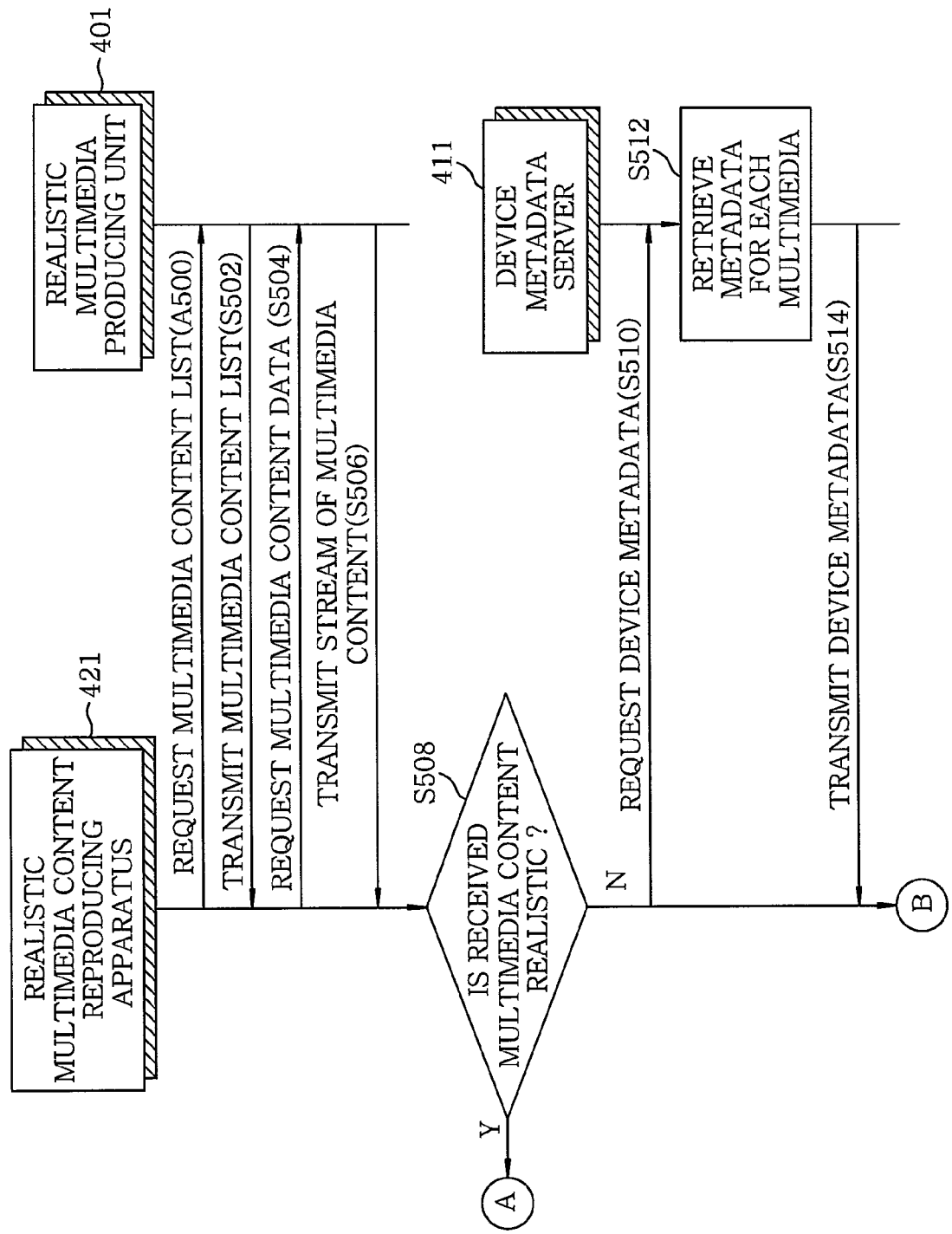
FIGS. 7A and 7B describe a control flow diagram illustrating an operation of implementing various realistic reproductions using downloadable device metadata in accordance with an embodiment of the present invention.
Figure 7B:
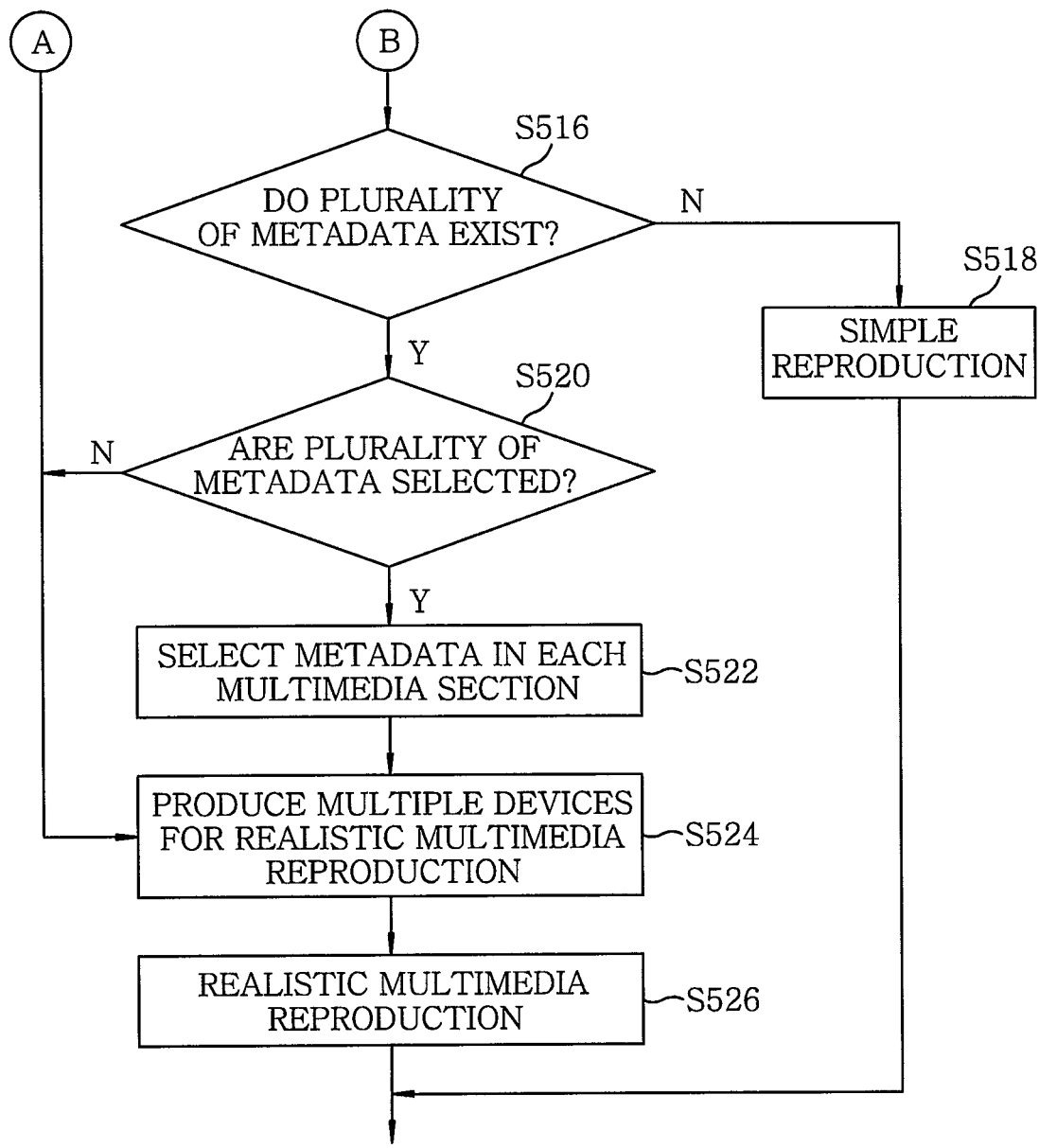

FIGS. 7A and 7B describe a control flow diagram illustrating an operation for reproducing various realistic effects based on a user's selection using downloadable device metadata in accordance with an embodiment of the present invention. The operation will now be described in detail with reference to FIGS. 7A and 7B.

First, the realistic multimedia content reproducing apparatus 421 transmits a message to the realistic multimedia content producing unit 401 via the Internet-based transceiver 423 in order to request a list of multimedia content (S500). The realistic multimedia content producing unit 401 analyzes the message received from the reproducing apparatus 421, recognizes that the received message requests the list of multimedia content, and then transmits the requested list of multimedia content (S502).

Subsequently, the realistic multimedia content reproducing apparatus 421 displays the list of multimedia content so that a user selects desired multimedia content, and then requests the realistic multimedia content producing unit 401 to provide the user-selected multimedia content data (S504).

The realistic multimedia content producing unit 401 then retrieves the requested multimedia content from the media storage 407 using the content manager 406, and transmits a stream of the multimedia content to the realistic multimedia content reproducing apparatus 421 via the Internet-based transceiver 405 (S506).

As described above, upon receipt of the stream of the multimedia content selected by the user from the realistic multimedia content producing unit 401, the realistic multimedia content reproducing apparatus 421 checks if the received multimedia content is a realistic multimedia content containing metadata for realistic reproduction (S508).

When the received multimedia content is a realistic multimedia content containing the metadata for realistic reproduction, the reproducing apparatus 421 synchronizes a device corresponding to the realistic multimedia content through the multiple-device processing (S524) to perform realistic multimedia reproduction (S526).

Contrary to this, if the multimedia content received from the realistic multimedia content producing unit 401, however, is a pure A/V multimedia content containing no metadata for realistic reproduction, the reproducing apparatus 421 requests the device metadata server 411 to provide realistic device metadata via the Internet-based transceiver 423 (S510). In order to request the realistic device metadata request, the reproducing apparatus 421 transmits the metadata request message (requestOfMetadata) as shown in FIG. 3A.

Then, the device metadata server 411 retrieves device metadata for realistic representation for each multimedia content (S512), and transmits the retrieval result as a metadata response message (responseOfMetadata) as shown in FIG. 3B to the reproducing system 421 (S514). In this case, there may be a plurality of metadata for the requested multimedia content. The device metadata server 411 allows to be downloaded all of the retrieved plurality of metadata so that the user selects a desired realistic effect in each multimedia content section.

Accordingly, the realistic multimedia content reproducing apparatus 421 analyzes the metadata retrieval result received from the device metadata server 411 (S516). When there is no metadata for the multimedia content, the realistic multimedia content reproducing apparatus 421 recognizes that it is a multimedia content incapable of being realistically reproduced and performs simple reproduction (S518).

Contrary to this, when a plurality of metadata retrieved for the multimedia content are received, the realistic multimedia content reproducing apparatus 421 receives a user's selection to see whether to select and reproduce a plurality of device metadata for the multimedia content (S520).

In this case, when reproduction of the multimedia content with one device metadata is selected, the realistic multimedia content reproducing apparatus 421 performs synchronization processing on the device corresponding to the realistic multimedia content through multiple-device processing (S524), and performs the realistic multimedia content reproduction (S526).

However, when reproduction of the multimedia content with a plurality of device metadata is selected, the realistic multimedia content reproducing apparatus 421 allocates device metadata to each reproduction section of the multimedia content based on a user's selection (S522), performs synchronization processing on a device corresponding to the multimedia content through multiple-device processing (S524), and performs realistic multimedia reproduction (S526).

While the invention has been shown and described with respect to the embodiments, it will be understood by those skilled in the art that various changes and modifications may be made without departing from the scope of the invention as defined in the following claims.

What is claimed is:

1. A system for reproducing multimedia content including audio/video and effects associated with the audio/video, comprising; a multimedia content producer providing the multimedia content comprising audio/video data of the audio/video;

a device metadata server providing one or more device effect control metadata for reproducing the effects associated with the multimedia content; and a multimedia reproducing apparatus downloading said one or more device effect control metadata for the multimedia content from the device metadata server, and applying device effect control metadata selected by a user to thereby reproduce the multimedia content with effects in a manner corresponding to the selected device effect control metadata, wherein the downloading uses a request message containing fields for a message identifier, a multimedia content name, a compression CODEC used in compression, a reproduction time of the content and one of a type of content from among realistic multimedia content and pure audio visual data and uses a response message having the message identifier, the multimedia content name, total message length, a count number of device metadata retrieved for the content, metadata payload size and metadata payload.

2. The system of claim 1, wherein the multimedia content provided by the multimedia producer is either multimedia content including pure A/V data or a multimedia content including device effect control metadata for reproduction.

3. The system of claim 1, wherein the multimedia reproducing apparatus includes:

a multimedia content analyzing unit synchronizing the multimedia content and the device effect control metadata selected for reproduction; and a multimedia content reproducing unit controlling a device in the multimedia reproducing apparatus based on the device effect control metadata to thereby reproduce the multimedia content.

4. The system of claim 3, wherein the multimedia content analyzing unit includes:
- a multimedia content analyzer analyzing whether the multimedia content is valid reproducible content;
- a device metadata processor verifying validity of the downloaded device effect control metadata; and
- a device synchronization processor synchronizing the multimedia content and the device effect control metadata in order to control operation of the device corresponding to each of the device metadata.

5. The system of claim 3, wherein the multimedia content reproducing unit includes:
- a device multi-processor controlling a corresponding device based on the device metadata; and
- a device manager verifying an operational state of the device.

6. The system of claim 1, wherein the multimedia content reproducing apparatus downloads the multimedia content and the device metadata via a wired or a wireless communication network.

7. A method for reproducing multimedia content including audio/video and effects associated with the audio/video, comprising:
- downloading multimedia content to be reproduced including the audio/video and effects associated with the audio/video;
- checking if the multimedia content includes device effect control metadata for reproduction including the audio/video and the effects associated with the audio/video;
- downloading a plurality of device effect control metadata for reproduction of the multimedia content if the multimedia content does not include the device effect control metadata; and
- reproducing the multimedia content effects associated with the audio/video by controlling a reproducing device to which the device effect control metadata selected by a user from the plurality of device effect control metadata are applied, wherein the downloading uses a request message containing fields for a message identifier, a multimedia content name, a compression CODEC used in compression, a reproduction time of the content and one of a type of content from among realistic multimedia content and pure audio visual data and uses a response message having the message identifier, the multimedia content name, total message length, a count number of device metadata retrieved for the content, metadata payload size and metadata payload.

8. The method of claim 7, further comprising: if the multimedia content includes device metadata, reproducing the multimedia content by controlling the reproducing device based on the device effect control metadata.

9. The method of claim 7, wherein the multimedia content and the device effect control metadata are downloaded via a wired or a wireless communication network.

10. The system of claim 1, wherein the multimedia reproducing apparatus further requests said one or more device effect control metadata from the device metadata server.

11. The system of claim 1, wherein the downloading occurs when the type of content is pure audio visual data.

12. The method of claim 7, wherein the downloading occurs when the type of content is pure audio visual data.

* * * * *